United States Patent [19]

Kamalski

[11] Patent Number: 4,491,957
[45] Date of Patent: Jan. 1, 1985

[54] FM-RECEIVER HAVING MULTIPATH RECEPTION DETECTOR AND NOISE PULSE SUPPRESSION

[75] Inventor: Theodor I. E. Kamalski, Eindhoven, Netherlands

[73] Assignee: U.S. Philips Corporation, New York, N.Y.

[21] Appl. No.: 440,763

[22] Filed: Nov. 10, 1982

[30] Foreign Application Priority Data

Aug. 31, 1982 [NL] Netherlands .................. 8203384

[51] Int. Cl.³ .................. H04B 1/10; H04H 5/00
[52] U.S. Cl. .................... 381/13; 455/334
[58] Field of Search ................. 381/2, 3, 10–12, 381/13; 455/50, 218, 306, 307, 212, 213, 334, 223

[56] References Cited

U.S. PATENT DOCUMENTS

| | | | |
|---|---|---|---|
| 3,921,077 | 11/1975 | Suzuki | 455/334 X |
| 3,999,132 | 12/1976 | Smith | 381/12 X |
| 4,191,850 | 3/1980 | Tanada | 381/13 |
| 4,408,098 | 10/1983 | Kamalski | 381/13 X |
| 4,419,541 | 12/1983 | Kishi et al. | 381/13 X |

FOREIGN PATENT DOCUMENTS 0169439  12/1981  Japan ........................ 381/2

*Primary Examiner*—R. J. Hickey
*Attorney, Agent, or Firm*—Thomas A. Briody; William J. Streeter; Charles E. Quarton

[57] ABSTRACT

FM-receiver comprising an aerial input having connected thereto, in succession, an RF input stage, an IF portion, an FM-detector and a stereo decoder having a mono-stereo control circuit therein, also a control signal generating circuit being connected thereto, the control signal generating circuit comprising a multipath reception detector and being connected to the IF portion via a level detector, the multipath reception detector comprising an amplitude detector connected to the level detector via a bandpass filter. The FM-receiver also comprises a noise pulse suppression circuit arranged between the FM-detector and the stereo decoder for keeping the amplitude of the stereo multiplex signal constant during the occurrence of noise pulses. In order to eliminate the disturbing effect of such noise pulses on the mono-stereo control circuit the bandpass filter has a lower 3 dB cut-off frequency of the order of magnitude of 1 KHz and an upper 3 dB cut-off frequency of not more than of the order of magnitude of 10 KHz.

5 Claims, 2 Drawing Figures

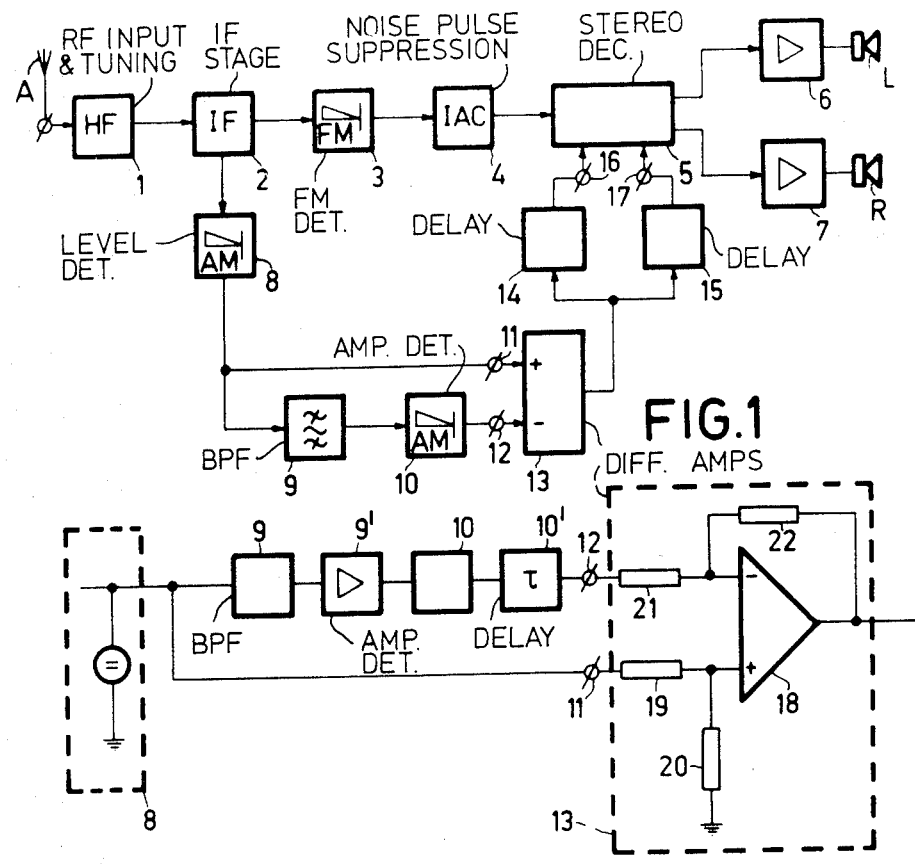
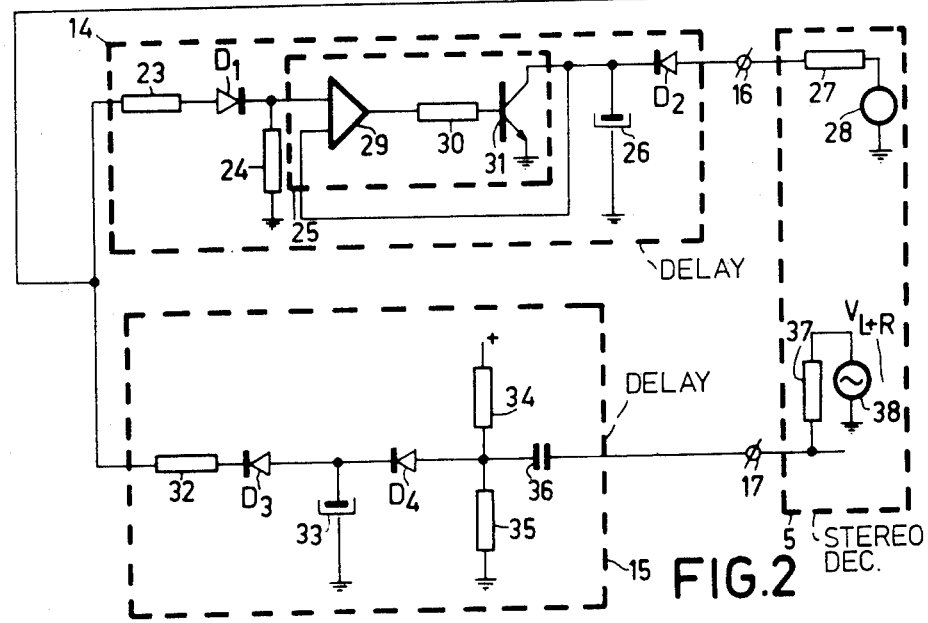

FM-RECEIVER HAVING MULTIPATH RECEPTION DETECTOR AND NOISE PULSE SUPPRESSION

BACKGROUND OF THE INVENTION

The invention relates to an FM-receiver comprising an aerial input having connected thereto, in succession, an RF input stage, an IF portion, an FM-detector and a stereo decoder and also comprising a control signal generating circuit and a mono-stereo control circuit connected thereto, the control signal generating circuit comprising a multipath reception detector and being connected to the IF portion via a level detector, the multipath reception detector comprising an amplitude detector connected to the level detector via a bandpass filter.

Such an FM-receiver is disclosed in German patent application No. 2 929 647, which has been laid open to public inspection.

The prior art FM-receiver comprises a mono-stereo switching circuit which at a low field strength and/or a high degree of multipath reception, effects a mono reproduction and at a high field strength and a low degree of multipath reception, effects a stereo reproduction. The audible noise produced by poor signal reception is thereby reduced at the cost, of a spatial reproduction. With the prior art FM-receiver, the multipath reception is measured by amplitude detection of the output signal of the level detector within the passband of said bandpass filter, the level detector being connected to the IF-portion. This passband may either be wide-banded (extending from some KHz to approximately 100 KHz) or narrow-banded around 19 KHz or 47 KHz. The field strength is measured by an integration of the output signal of the said level detector. The control signal for the mono-stereo switching circuit is obtained by subtracting the output signals of the multipath reception detector and the field strength detector from each other, after a mutual amplitude match.

Pulse-shaped, artificial interferences (so-called man-made noise) caused, for example, by electric ignitions of internal combustion engines, may however produce noise components which pass said bandpass filter and are included in the measurement of the multipath reception. The control signal for the mono-stereo switching circuit of the prior art FM receiver is consequently partly determined by these noise pulses. Even in good receiving conditions, that is to say where a low degree of multipath reception and a high field strength occur, these noise pulses may cause frequent and/or prolonged mono reproduction. This indeed somewhat reduces the annoying effect of the noise pulses on the reproduction, but it also causes an audible loss of spatial reproduction which, particularly in the case of rapidly repeating mono change-over actions may result in a spatially instable sound impression of continuously springing sound sources.

SUMMARY OF THE INVENTION

It is an object of the invention to provide an FM-receiver which comprises a field strength and multipath reception-dependent mono-stereo control, noise pulses not, at least to a much lesser extent, being noticable in the sound reproduction than with the prior art FM-receiver nor resulting in loss of a spatial sound impression.

According to the invention, an FM-receiver of the type described in the opening paragraph, is characterized in that in case the FM-receiver comprises a noise pulse suppression circuit arranged between the FM-detector and the stereo decoder for keeping the amplitude of the stereo multiplex signal constant during the occurrence of noise pulses, the bandpass filter has a lower 3 dB cut-off frequency of the order of magnitude of 1 KHz and an upper 3 dB cut-off frequency of not more than of the order of magnitude of 10 kHz.

In contrast to the prior art FM-receiver wherein noise pulses effect a mono-reproduction and as a result thereof are reproduced somewhat less strongly, in the FM-receiver in accordance with the invention noise pulses in the signal path as well as in the control path are eliminated. The elimination of noise pulses in the signal path is effected by means of said noise pulse suppression circuit which is known per se from for example, German Patent Specification No. 26 53 508. In the manner described therein this noise pulse suppression circuit prevents noise pulses from being reproduced by keeping the amplitude level of the stereo multiplex signal just prior to each noise pulse constant during the occurrence of the noise pulse.

Using only this noise pulse suppression circuit does however not prevent the occurrence of a noise pulse-dependent mono reproduction. To prevent such a mono reproduction from occurring, the noise pulses must also be eliminated in the control path which, in accordance with the invention, is effected by means of the last-mentioned bandpass filter. The choice of the filter parameters of this bandpass filter is based on the recognition, that noise components which are the result of man-made noise become manifest in the output signal of the level detector in a frequency range above 10 KHz. In contrast thereto, amplitude variations of the FM-IF signal between approximately 1 KHz and 10 KHz are almost exclusively produced by multipath reception effects. When the measure in accordance with the invention is used, a substantially interference-free reproduction in combination with a spatially stabilized sound impression is obtained.

A preferred embodiment of an FM-receiver in accordance with the invention is characterized in that in the control signal generating circuit the level detector is part of a field strength detector and is connected in a wide-band mode to a first input of a differential stage, and that the multipath reception detector is connected to a second input of the differential stage, the differential stage being connected via a first delay circuit to the mono-stereo control circuit, this first delay circuit producing a continuously variable mono-stereo control signal having a rise time constant of at least 100 msec at a change-over to mono reproduction, and a decay time constant of not more than 10 msec, at a change to stereo reproduction.

In the field strength detector of the prior art FM-receiver a certain amount of elimination of noise pulses is effected by means of integration of the level detector output signal. However, such an integration also results in that the field strength indication obtained therewith follows field strength variations in either direction with a delay which results in an undesirably slow mono-stereo control. In contrast thereto, in the FM-receiver in accordance with the invention the field strength variations produced by noise pulses are not eliminated in the field strength detector, but they are only eliminated after the differential stage and the delay circuit by means of an integration thereof with a field strength variation direction-dependent time constant. In practice it has been found that a fast control from stereo to mono and a gradual control from mono to stereo as is obtained when the measure in accordance with the invention is used, results in a spatial sound impression which varies in a smooth and acceptable manner.

A still further preferred embodiment of the FM-receiver in accordance with the invention is characterized by a continuous tone control, as well as by a second delay circuit arranged between the level detector and the continuous tone control for producing a continuously variable tone control signal having a rise time and a decay time constant of the order of magnitude of 1.5 sec. and 500 msec., respectively.

DESCRIPTION OF THE DRAWING

The invention will now be further described by way of example with reference to the Figures shown in the accompanying drawing.

Herein:

FIG. 1 shows an FM-receiver in accordance with the invention;

FIG. 2 shows a practical embodiment of a control signal generating circuit for use in the FM-receiver of FIG. 1.

DESCRIPTION OF THE PREFERRED EMBODIMENT

FIG. 1 shows an FM-receiver in accordance with the invention comprising an aerial A having connected thereto, in succession, an RF-input and tuning stage 1, an FM-IF portion 2, an FM-detector 3, an interference absorption circuit (IAC) 4 functioning as a noise pulse suppressing circuit, a stereo decoder 5, left and right audio output stages 6, 7 and loudspeakers L and R. How the signal is processed in these circuits is known: a desired FM-aerial signal is selected and converted to a fixed FM-intermediate frequency (10.7 MHz) by means of the RF-input and tuning stage 1, is amplified and limited in the FM-IF portion 2 and frequency-demodulated by the FM-detector 3. Thereafter, the baseband modulation signal thus obtained is freed from noise pulses in the noise pulse suppression circuit 4, which is, for example, provided by the integrated circuit TDA 1001A, and, in the event of a stereo multiplex signal, is further decoded into left and right stereo signals which are reproduced by means of the loudspeakers L and R after having been amplified in the audio output stages 6 and 7.

The FM-receiver described so far is known per se from U.S. Pat. No. 3,739,285 and a further description is not necessary for an understanding of the invention.

The stereo decoder 5 of the FM-receiver in accordance with the invention is provided by an integrated circuit of the type TDA 1005A. This integrated circuit also comprises a mono-stereo control circuit and a tone control circuit, both not shown, which effect in known manner a continuous mono-stereo change-over and a continuous tone control in the reproduction by means of a control signal applied to mono-stereo and tone control inputs 16 and 17, respectively.

In addition, the FM-receiver in accordance with the invention comprises a control signal generating circuit 8-15 which comprises an amplitude detector which functions as a level detector 8 and is connected to the FM-IF portion 2 and to which a non-limited FM intermediate frequency signal is applied. The time constant of the level detector 8 has been chosen sufficiently small ($\leqq 0.1$ msec.), to detect the spurious modulation of the FM intermediate-frequency signal over a wide frequency range, for example from 0 to at least 10 KHz or preferably 100 KHz. Consequently, the output signal of the level detector 8 accurately indicates the field strength of the received signal and is applied as a wideband signal to a first input 11 of a differential stage 13.

The output of the level detector 8 is also connected to a multipath reception detector 9, 10, which comprises a bandpass filter 9 and an amplitude detector 10 coupled thereto. The bandpass filter 9 selects the spurious modulation signal, from the level detector 8 within a 3 dB frequency band of 4.5 KHz (Q=0.8) around a central frequency of 3.5 KHz. The spurious modulation signal thus selected is thereafter integrated in the amplitude detector 10, which in a practical embodiment has a time constant of approximately 500 msec. Acceptable results are generally obtained when the bandpass filter 9 has a 3 dB-passband range of not more than 10 KHz around a central frequency of the order of magnitude of 5 KHz and the amplitude detector 10 has a time constant of at least 50 msec.

In accordance with one aspect of the invention the output signal of the amplitude detector 10 gives a rather accurate indication of the degree of multipath reception in the received FM-signal, which is not, or hardly, affected by noise pulses. This output signal is applied to a second input 12 of the differential stage 13 and subtracted therein from the above-mentioned signal at the first input 11. The difference signal thus obtained at the output of the differential stage 13 is used for both the mono-stereo control and the tone control of the stereo decoder which is provided by the integrated circuit (TDA 1005A). An increase of this difference signal effects a delayed increase of the spatial sound impression and a likewise delayed increase of the audible frequency range and a decrease of the difference signal is substantially directly followed by a decrease of the spatial sound impression and followed after a delay by a decrease of the audible frequency range. The signal delays required therefor are realized, in a manner still further to be described, by means of first and second delay circuits 14 and 15 arranged between the differential stage 13 and the mono-stereo control input 16 and the tone control input 17, respectively, of the stereo decoder 5 which is provided by the integrated circuit (TDA 1005A). In the event of a variable receiving signal quality, these signal delays enhance a spatial and a frequency-based stabilization of the sound impression, respectively.

FIG. 2 shows a practical embodiment of a control signal generating circuit 8-15 in which circuits whose functions correspond to those of the circuits shown in the preceding Figure have been given the same reference numerals. The level detector 8 is realized by means of an integrated circuit of the type TEA 5560. An output of the level detector 8 is connected to a non-inverting input of a differential amplifier 18 via a first input 11 of differential stage 13 and a voltage divider 19, 20, and also to an inverting input of differential amplifier 18 via the multipath reception detector 9, 9', 10, 10', the second input 12 of the differential stage 13 and an input resistor 21. An output of the differential amplifier 18 is connected to said inverting input via a feedback resistor 22.

The multipath reception detector 9, 9', 10, 10' comprises an amplifier 9' arranged between the bandpass filter 9 and the amplitude detector 10, and a delay circuit 10' connected to the output of the amplitude detector 10. The amplifier 9' provides, in combination with the input resistor 21, the feedback resistor 22 and the voltage divider 19, 20, an adequate mutual amplitude match and difference formation of the multipath reception indication and the field strength indication. The delay circuit 10' produces an output signal which delays an increase of the input signal integrated over an RC-time constant of 0.5 sec. and which follows a decrease substantially undelayed ($\tau = 25$ msec.). This delay circuit 10' may, if so desired, be of the same construction as the first delay circuit 14 described hereinafter and may optionally replace this first delay circuit 14 or be replaced by it.

The output signal of the differential amplifier 18 is applied to the first delay circuit 14 to be submitted therein to a delay in the event of an increasing amplitude. For that purpose the first delay circuit 14 comprises a comparison circuit 25, which is connected to the output of the differential stage 13 via a series arrangement of a resistor 23 and a diode $D_1$. The cathode of the diode $D_1$ is connected to ground via a resistor 24 and is also connected to an inverting input of an operational amplifier 29 of the comparison circuit 25. An output of the operational amplifier 29 is connected via a resistor 30 to the base of a transistor 31, whose emitter is connected to ground and whose collector forms the output of the comparison circuit 25. This collector output is fed-back to a non-inverting input of the operational amplifier 29 and is also connected to the cathode of a diode $D_2$ via a grounded capacitor 26. The anode of this diode $D_2$ is connected via the mono-stereo control input 16 to the integrated circuit of the type TDA 1005A, which, in addition to the stereo decoder, also comprises a voltage source 28, which is connected to the mono-stereo control input 16 via a resistor 27. This voltage source 28 supplies a voltage of approximately 1.4 V on receipt of FM-stereo signals and a voltage of 0 V on receipt of FM-mono signals.

As a result of the threshold and the diode voltage of the diode $D_1$, and the voltage division across the resistors 23 and 24, an increase in the output voltage of differential stage 13 is followed by a delayed and amplitude matched voltage increase at the inverting input of the operational amplifier 29. At such an increase, the voltage across the capacitor 26, that is to say the voltage at the non-inverting input of the operational amplifier 29, is less than the voltage at the inverting input and the operational amplifier 29 produces a negative, at least sufficiently low voltage to the base of the transistor 31, via the resistor 30, to cut-off this transistor 31. Consequently, on receipt of FM-stereo signals, the capacitor 26 is slowly charged from the voltage source 28 via the resistor 27 and the diode $D_2$ with an RC-time constant determined by the resistor 27, the diode resistance of $D_2$ and the capacitance of the capacitor 26. This, which is commonly referred to as the rise-time constant, determines the rate of increase of the mono-stereo control signal at control input 16 and, for an adequate operation, should amount to at least 100 msec.

A decrease in the output voltage of the differential stage 13 results in the voltage across the capacitor 26, that is to say the voltage at the non-inverting input of the operational amplifier 29, becoming larger than the voltage at the inverting input. As a result thereof, the output voltage of the operational amplifier 29 becomes positive and, via the resistor 30, makes the transistor 31 conductive, which short-circuits the voltage across the capacitor 26. In response thereto a decrease of the output voltage of the differential stage 13 is almost immediately followed by a decrease of the mono-stereo control signal. The time constant, being commonly referred to as the decay-time constant, and being determined by the transistor 31 and the capacitor 26, is substantially zero and must not be more than 10 msec. for adequate operation.

In the embodiment shown, the delay circuit 10' may optionally be omitted. It is alternatively possible to omit the signal delays in the first delay circuit 14 when the delay circuit 10' is used, by omitting the comparison circuit 25 and the capacitor 26. In the last-mentioned embodiment the diode $D_2$ has for its object to prevent, on receipt of mono signals so when the output voltage of the voltage source 28 is zero, a residual voltage across the capacitor 26 from effecting an unnecessary mono-stereo setting.

The output signal of the differential stage 13 is also applied to the second delay circuit 15 to be submitted therein to a delay, both when the amplitude increases or decreases. To this end the second delay circuit 15 comprises a grounded capacitor 33, one side of which being connected to the differential stage 13 via a series arrangement of a diode $D_3$ and a resistor 32, and on the other side being connected via a diode $D_4$ to the tapping point of a voltage divider 34, 35 arranged between a supply voltage and ground. The diodes $D_3$ and $D_4$ have been chosen such that a discharge path of the capacitor 33 is formed by the diode $D_3$, the resistor 32 and the output impedance of the differential stage 13 and that a charging path is formed by the resistor 34 of the voltage divider 34, 35 and the diode $D_4$.

The tapping point of the voltage divider 34, 35 is also connected via a capacitor 36 to the tone control input 17, to which a voltage source 38 applies a stereo sum signal (L+R)-depending signal voltage via a resistor 37. Together with the variable and conduction-depending diode resistance of the diode $D_4$ and the capacitor 33, the capacitor 36 forms a variable tone filter at the tone control input 17, which variably filters the stereo sum signal L+R supplied by the voltage source 38.

If the output voltage of the differential stage 13 decreases to below the maximum capacitor voltage, that is to say the voltage at the tapping point of the voltage divider 34, 35, then the capacitor 33 will be discharged via the diode $D_3$ and the resistor 32. As a result thereof the capacitor voltage becomes less than the voltage at said tapping point, so that the diode $D_4$ starts conducting. In response thereto the stereo sum signal (L+R) applied to the tone control input 17 is short-circuited frequency-dependently via the capacitor 36, the diode resistance of the diode $D_4$, which resistance depends on the degree of conduction, and the capacitor 33. This tone control follows a decrease of the output signal of the differential stage 13 with a delay having an RC-time constant, or so-called decay time constant, which is determined by the capacitance of the capacitor 33 and the resistance value of the diode $D_3$, the resistor 32 and the output impedance of the differential stage 13.

If the output signal of the differential stage 13 increases, then the diode $D_3$ is cut-off and the capacitor 33 is charged with an RC-time constant, or so-called rise-time constant, determined by the capacitance of the capacitor 33 and the resistance values of the diode resistance of $D_4$ and the resistor 34. The diode resistance of $D_4$ then gradually increases as does also, frequencywise, the cross-over point in the frequency response characteristic which is realized by the capacitors 33 and 36 and the diode D4. The tone control then follows a decrease of the output signal of the differential stage 13 with a delay equal to the last-mentioned time constant.

In a practical embodiment there were used in addition to the above-mentioned integrated circuits TEA 5560 as the level detector 8 and TDA 1005A as the stereo decoder 5 also an integrated circuit MC 3302 as the comparison circuit 25, diodes of the type BA 317 as the diodes $D_1$, $D_3$ and $D_4$ and a diode of the type AA 119 as the diode $D_2$.

The resistors had the following values:

| Resistors | Valves | Capacitors | Valves F |
|-----------|--------|------------|----------|
| 19 | 100K | 26 | 100 μ |
| 20 | 100K | 33 | 68 μ |
| 21 | 1 M | 36 | 27 μ |
| 22 | 1 M | | |
| 23 | 3K | | |
| 24 | 1K | | |
| 27 | 6K 8 | | |
| 32 | 10K | | |
| 34 | 22K | | |
| 35 | 18K | | |

In practice, it has been found that resistance and capacitance deviations which cause a deviation of approximately 30% of the time constant mentioned in the foregoing are acceptable.

It will be obvious that the invention is not limited to the embodiments shown. It is very well possible to use the inventive idea with only delay circuits or without delay circuits and/or without a combination with a field strength indication. These last-mentioned additions achieve only an improvement in the effect aimed at.

What is claimed is:

1. An FM-receiver comprising an aerial input having connected thereto, in succession, an RF input stage, an IF portion, an FM-detector and a stereo decoder having a mono-stereo control circuit therein, a control signal generating circuit being connected thereto, the control signal generating circuit comprising a multipath reception detector coupled to a level detector, said detector being connected to the IF portion, the multipath reception detector comprising an amplitude detector coupled to a bandpass filter, said bandpass filter being connected to the level detector, characterized in that the FM-receiver further comprises a noise pulse suppression circuit arranged between the FM detector and the stereo decoder for keeping the amplitude of the stereo multiplex signal constant during the occurrence of noise pulses, and the bandpass filter has a lower 3 dB cut-off frequency of the order of magnitude of 1 KHz and an upper 3 dB cut-off frequency of not more than of the order of magnitude of 10 KHz.

2. An FM-receiver as claimed in claim 1, characterized in that the control signal generating circuit further comprises a differential stage and the level detector is a field strength detector and is connected in a wide-band mode to a first input of the differential stage, and that the multipath reception detector is connected to a second input of the differential stage, the differential stage being connected to the mono-stereo control circuit via a first delay circuit, this first delay circuit producing a continuously variable mono-stereo control signal having a rise time constant of at least 100 msec. at a change-over to mono reproduction, and a decay time constant of not more than 10 msec. at a change to stereo reproduction.

3. An FM-receiver as claimed in claim 2, characterized in that said stereo decoder further includes a continuous tone control and said control signal generating circuit further comprises a second delay circuit arranged between the level detector and the continuous tone control for producing a continuously variable tone control signal having a rise time and decay time constant of the order of magnitude of 1.5 sec and 500 msec. respectively.

4. An FM-receiver as claimed in claim 2, characterized in that the first delay circuit comprises a feedback differential amplifier, a first input of which is coupled to an output of said differential stage and an output of which is connected across a charging capacitor and also to a second input of the differential amplifier, the charging capacitor being coupled to a constant voltage source in said mono-stereo control circuit via a diode and a series resistor.

5. An FM-receiver as claimed in claim 3, characterized in that the first delay circuit comprises a feedback differential amplifier, a first input of which is coupled to an output of said differential stage and an output of which is connected across a charging capacitor and also to a second input of the differential amplifier, the charging capacitor being coupled to a constant voltage source in said mono-stereo control circuit via a diode and a series resistor.

* * * * *